United States Patent
Lindner et al.

(10) Patent No.: US 8,177,298 B2
(45) Date of Patent: May 15, 2012

(54) LOADING FLAP FOR A VEHICLE SEAT

(75) Inventors: Ralf Lindner, Wuppertal (DE); Markus Lindgens, Mönchengladbach (DE); Stefan Stamm, Bytka (SK)

(73) Assignee: Johnson Controls GmbH, Burscheid (DE)

( * ) Notice: Subject to any disclaimer, the term of this patent is extended or adjusted under 35 U.S.C. 154(b) by 99 days.

(21) Appl. No.: 12/532,333

(22) PCT Filed: Mar. 20, 2008

(86) PCT No.: PCT/EP2008/002258
§ 371 (c)(1),
(2), (4) Date: Apr. 14, 2010

(87) PCT Pub. No.: WO2008/113594
PCT Pub. Date: Sep. 25, 2008

(65) Prior Publication Data
US 2010/0219673 A1    Sep. 2, 2010

(30) Foreign Application Priority Data

Mar. 21, 2007 (DE) .......................... 10 2007 014 070
Dec. 12, 2007 (DE) .......................... 10 2007 060 319

(51) Int. Cl.
A47B 83/02    (2006.01)
A47C 7/62     (2006.01)
(52) U.S. Cl. .................................. 297/188.07; 297/163
(58) Field of Classification Search ............. 297/188.07, 297/163
See application file for complete search history.

(56) References Cited

U.S. PATENT DOCUMENTS

| 6,302,484 | B1 | 10/2001 | Araki et al. | |
| 6,702,375 | B1* | 3/2004 | Laskowski et al. | 297/188.07 |
| 7,114,772 | B2* | 10/2006 | Kobayashi et al. | 297/188.07 X |
| 7,611,183 | B2* | 11/2009 | Burkey et al. | 297/188.07 X |
| 2002/0121536 | A1* | 9/2002 | Butz et al. | 224/543 |
| 2009/0134633 | A1 | 5/2009 | Thies | |

FOREIGN PATENT DOCUMENTS

| DE | 3738931 A1 | 6/1989 |
| DE | 9400639 U1 | 3/1994 |
| DE | 94006393 U1 | 3/1994 |
| DE | 19700706 A1 | 10/1997 |
| DE | 10004021 C1 | 6/2001 |
| DE | 10354164 A1 | 6/2005 |
| DE | 102004028846 B3 | 8/2006 |
| EP | 0965488 A | 12/1999 |

OTHER PUBLICATIONS

Deutsches Patent Und Markenamt, Search Report, DE102007060319, Dec. 12, 2007, Germany.
Patent Treaty Cooperation, International Preliminary Report on Patentability, PCT/EP2008/002258, Sep. 22, 2009.
Patent Treaty Cooperation, International Search Report, PCT/EP2008002258/ Sep. 12, 2008.

* cited by examiner

Primary Examiner — Rodney B White
(74) Attorney, Agent, or Firm — Butzel Long

(57) ABSTRACT

A loading flap is pivotally mounted on the backrest of a vehicle seat and can be locked with the backrest. The locking operation can be carried out using positive and/or non-positive means, e.g. a bolt that moves in a translatory and rotative manner during locking and unlocking. The loading flap includes a housing that may be moved in a translatory manner parallel thereto during opening.

7 Claims, 4 Drawing Sheets

LOADING FLAP FOR A VEHICLE SEAT

The invention relates to a loading flap which is pivotally mounted on the backrest of a vehicle seat, in particular a rear seat bench of a motor vehicle, and may be locked with said backrest.

Such loading flaps are known from the prior art, for example DE G 94 00 639 as well as EP 0 965 488, but have the drawback that they may provide insufficient safety in the event of an accident.

The object of the invention is to increase the safety against inadvertent opening of the loading flap, in particular in the event of an impact from the loaded goods caused by an accident.

The object is achieved by a loading flap which is pivotally mounted on the backrest of a vehicle seat and may be locked with said backrest, the locking operation being carried out using a positive and/or non-positive connecting means, for example a bolt, which moves in a translatory and rotative manner during locking and unlocking.

As a result of the superimposed movements, automatic opening of the loading flap is at least made difficult. The loading flap according to the invention may be produced easily and cost-effectively.

The invention relates to a loading flap, by means of which elongate objects may be loaded from the luggage space, for example, through the rear bench into the passenger compartment. Preferably, the loading flap is arranged in the region of the seat structure on the side of the backrest of the rear seat facing the luggage space. According to the invention, said loading flap is arranged on the backrest in a manner which is pivotable from a closed position into an open position and vice versa. Preferably, in the open state the loading flap bears against the loading surface of the luggage space or is incorporated therein. In a further preferred embodiment, the loading flap bears against the armrest in the open state and particularly preferably is incorporated in the backrest in the closed state. Furthermore, according to the invention the loading flap may be locked to the backrest, in particular in the closed state, in order to prevent objects moving from the loading space into the passenger compartment, for example in the event of an accident. This locking is carried out by a positive and/or non-positive connecting means, in particular by a bolt. In the locked state, the positive and/or non-positive connecting means protrude from the loading flap.

This positive and/or non-positive connecting means carries out a translatory and a rotative movement relative to the loading flap during locking and unlocking. The translatory and/or rotative movement may take place at the same time or at different times. Preferably, the movements are, however, superimposed, i.e. at least partially at the same time.

The positive and/or non-positive connecting means may, for example, be a bolt, which is preferably designed to be L-shaped or hook-shaped, the bolt which is bent in a hook-shaped manner particularly preferably having an undercut. The positive and/or non-positive connecting means of the loading flap cooperate non-positively and/or positively in the locked state with a complementary locking component on the backrest. Preferably, the positive and/or non-positive connecting means encompass a locking pin or a locking component in the backrest in the manner of a rotary latch.

In addition to this positive and/or non-positive connecting means, an additional securing means against inadvertent opening may be arranged on the loading flap, in particular on the housing.

Preferably, the loading flap comprises a housing which, for opening the loading flap, may be moved in a translatory manner parallel thereto and along the surface thereof away from the locking component. Particularly preferably, said housing has a handle by which the housing may be manually actuated. The movement of the housing along the loading flap is preferably guided by guide elements.

Preferably, the positive and/or non-positive connecting means is rotatably mounted on the housing about a pivot pin.

Further preferably, the loading flap comprises a stop on which the positive and/or non-positive connecting means rolls. This stop, against which the positive and/or non-positive connecting means bears, preferably causes the positive and/or non-positive connecting means to rotate relative to the housing during the translatory movement of the housing. As a result, the translatory movement of the housing results in a rotational movement of the positive and/or non-positive means, so that by means of its mounting on the housing said positive and/or non-positive means carries out as a whole a translatory and rotative movement.

Preferably, the positive and/or non-positive connecting means is pretensioned by a spring means into the closed position.

In a preferred embodiment, the housing is also pretensioned by a spring means into a closed position.

Preferably, the housing has a securing means which holds said housing in its open position. This securing means is particularly preferably released automatically when closing the flap.

The invention is explained hereinafter with reference to FIGS. 1-4. These explanations are merely provided by way of example and do not restrict the general inventive idea.

Figure 1:
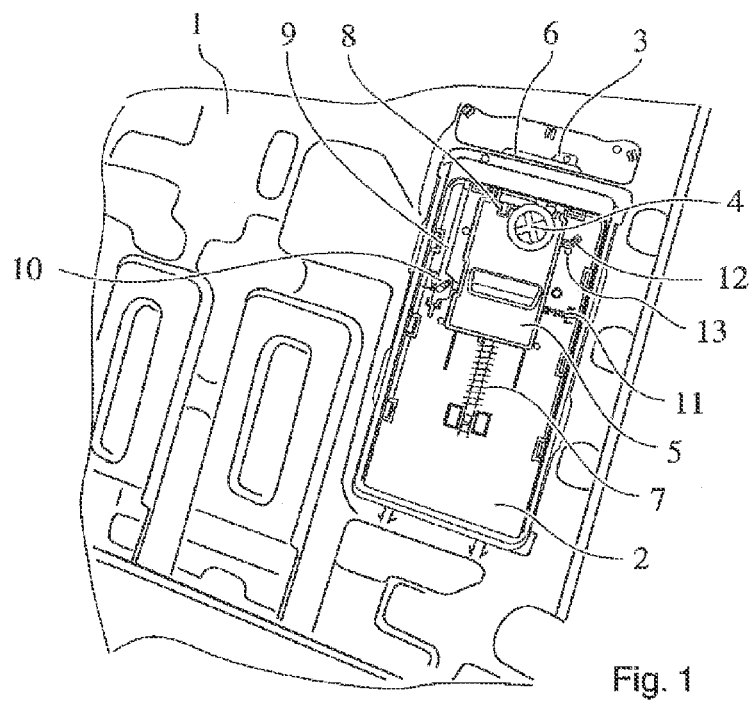
FIGS. 1-3 show the loading flap in the closed, locked state.
Figure 2:
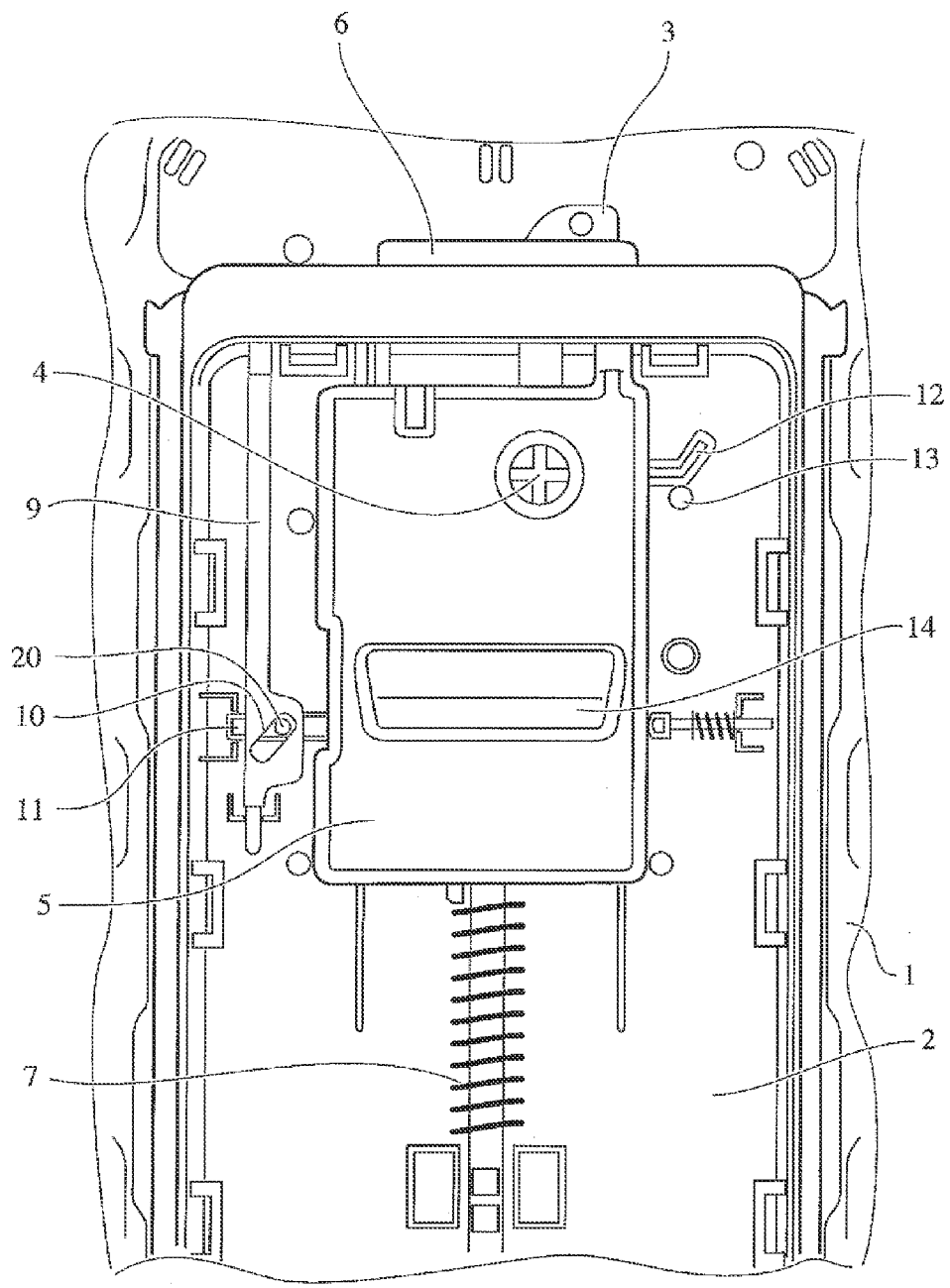
Figure 3:
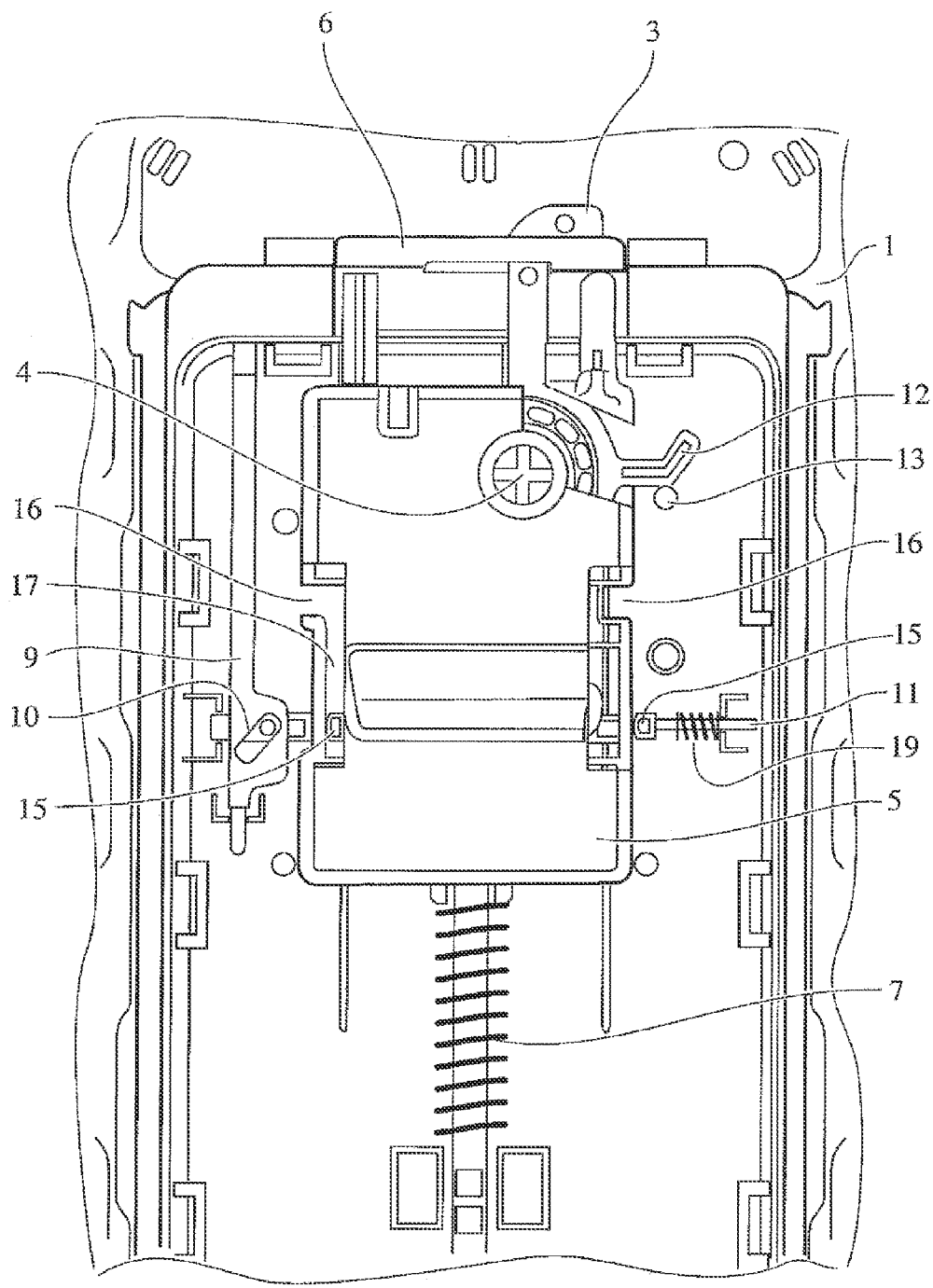
Figure 4:
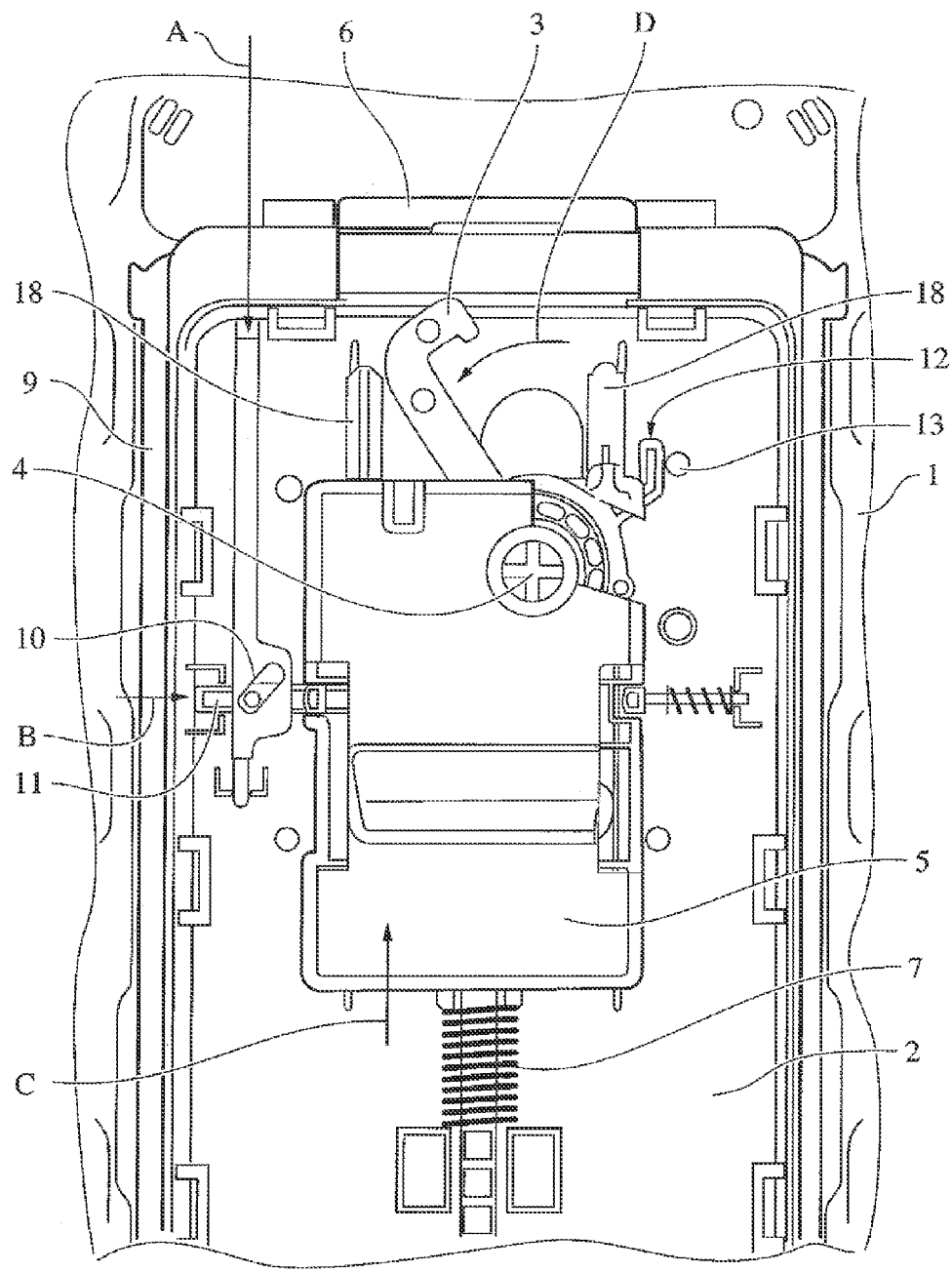
FIG. 4 shows the loading flap in the unlocked state.

FIGS. 1 to 3 show a rear view of the backrest 1 of a rear seat bench, with a loading flap 2 incorporated pivotally therein, which is secured against undesired opening on its side opposing the pivot axis by means of a bolt 3. The bolt 3 formed in the manner of a hook is rotatably arranged in a housing 5 (shown open in FIG. 1) about a pivot pin 4, and engages in its closed position in the slot of a locking component 6 on the backrest side, which opens towards the edge of the loading flap 2. Moreover, the locking component 6 may have a pin (not shown), around which the bolt engages during closing, which represents an additional securing of the pin against undesired opening. Moreover, the securing pins 18 which are arranged on the housing cooperate with the locking component 6 in a secure manner. The housing 5, which is longitudinally displaceably mounted on the rear side of the loading flap, is pretensioned by a spring 7 in the direction of the locking component 6. The bolt 3 is, in turn, also loaded by a spring 8 in the closing direction. For opening the loading flap 2, the housing, as shown by arrow C in FIG. 4, is pulled downward. To this end, the housing has a handle 14. At the same time the spring force of the spring 7 is increased. When moving the housing away from the locking component 6, the locking means 18 are brought out of engagement with the locking component 6. Moreover, as a result of the contact of a projection 12 on the bolt side, the bolt 3 is simultaneously rotated into its open position by a stop 13 on the loading flap side (arrow D). This relationship is shown in FIG. 4.

It is further visible from FIGS. 1-4 that the loading flap according to the invention has a slider 11 which is also displaceably arranged on the loading flap transversely to the direction of displacement of the housing 5. Securing means 15 are arranged on the slider 11 which secure the housing in a position remote from the locking component 6. These securing means 15 cooperate positively in this position shown in FIG. 4 with recesses 16 in the housing 5. When displacing the housing into the open position, the left-hand securing means moves along the channel 17. The slider 11 is pretensioned by a spring means 19 such that the securing means 15 are brought into engagement with the recesses 16, as soon as the recesses 16 are level with the securing means 15 by the downward displacement of the housing. As a result, the entire slider 11 moves to the left. On the slider 11, moreover, a pin 20 is arranged which cooperates with a slotted deflector 10 which is arranged on a pin 9 provided displaceably and at right angles to the slider 11. The pin 20 and the slot 10 cooperate such that during the displacement of the slider 11 the pin 9 is forced upward to the left, so that it protrudes from the loading flap.

If the loading flap is now closed again, the pin 9 strikes against the frame of the loading flap, which is arranged on the backrest of the rear seat and is thus forced downward (arrow A). As a result, the slider, as shown by arrow B, is pushed to the right. Thus the spring 19 is compressed and the positive connection between the securing means 15 and the recesses 16 is cancelled. The housing is accordingly no longer secured in its open position and is forced upward by the spring 7, shown by arrow C. As a result, the bolt 3 as well as the securing means 18, again lock the loading flap to the backrest.

LIST OF REFERENCE NUMERALS

1 Backrest
2 Loading flap
3 Positive and/or non-positive connecting means, bolt
4 Pivot pin
5 Housing
6 Locking component
7, 8 Spring
9 Pin
10 Slotted deflector
11 Slider
12 Projection
13 Stop
14 Handle
15 Securing means
16 Recess in the housing 5
17 Guide channel
18 Securing means
19 Spring means
20 Pin

The invention claimed is:

1. A loading flap pivotally mounted on the backrest of a vehicle seat and lockable with the backrest, the loading flap comprising:
 a connecting means which moves in a translatory and rotative manner during locking and unlocking the loading flap; and
 a housing which, in opening the loading flap, moves in a translatory manner parallel thereto the loading flap.

2. The loading flap as claimed in claim 1, wherein the connecting means is rotatably mounted on the housing about a pivot pin.

3. The loading flap as claimed in claim 2, further comprising a stop on which the connecting means rolls.

4. The loading flap as claimed in claim 3, wherein the connecting means is pretensioned by a spring means into a closed position of the loading flap.

5. The loading flap as claimed in claim 4, wherein the housing is pretensioned by the spring means into the closed position of the loading flap.

6. The loading flap as claimed in claim 5, wherein the housing has a securing means in an open position of the loading flap.

7. The loading flap as claimed in claim 1, wherein the connecting means is a bolt.

* * * * *